D. A. SCHAEFER.
COOKING UTENSIL.
APPLICATION FILED APR. 3, 1908.
910,318.
Patented Jan. 19, 1909.
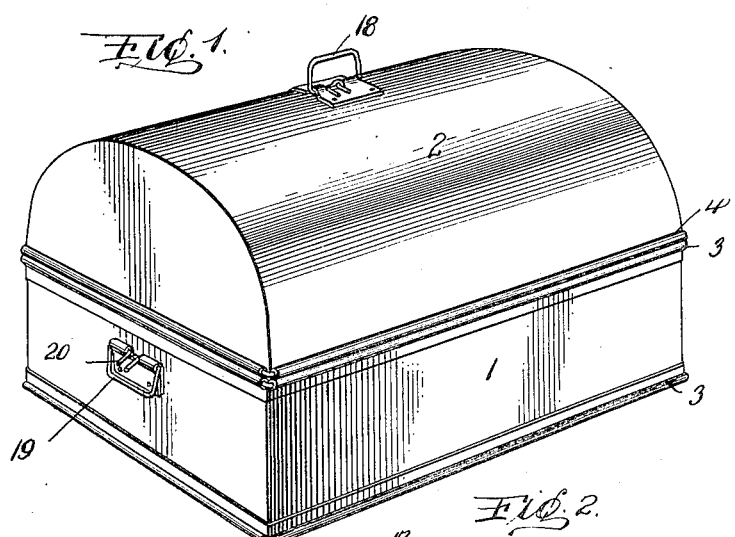
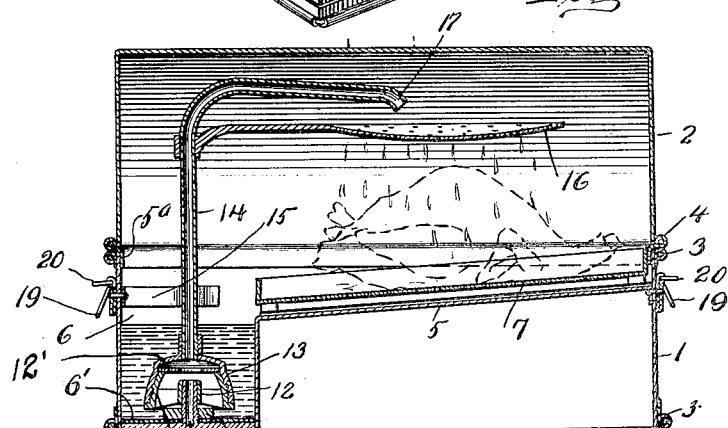
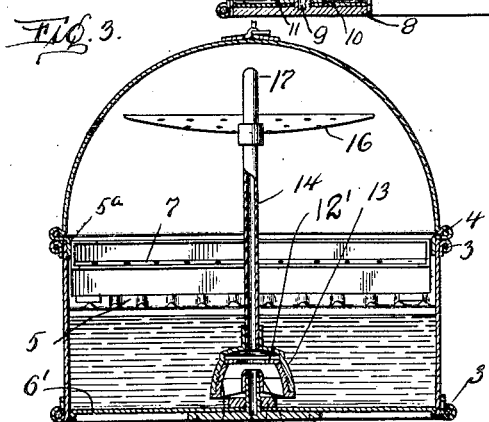
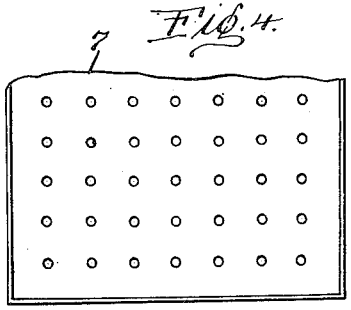
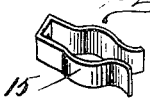
Inventor
D. A. Schaefer.

UNITED STATES PATENT OFFICE.

DAISY A. SCHAEFER, OF PITTSBURG, PENNSYLVANIA.

COOKING UTENSIL.

No. 910,318.　　　Specification of Letters Patent.　　　Patented Jan. 19, 1909.

Application filed April 3, 1908. Serial No. 424,966.

*To all whom it may concern:*

Be it known that I, DAISY A. SCHAEFER, a citizen of the United States of America, residing at Pittsburg, in the county of Allegheny and State of Pennsylvania, have invented certain new and useful Improvements in Cooking Utensils, of which the following is a specification, reference being had therein to the accompanying drawing.

This invention relates to a cooking utensil, and more particularly to that class of utensils commonly known as "basters" and "roasters."

The primary object of this invention is to provide novel means for basting a piece of meat, while the same is being cooked in a utensil.

A further object of this invention is to provide a simple and inexpensive utensil for roasting meat, and preventing the meat from becoming dry while being roasted.

To this end, I have devised a novel utensil wherein a perforated tray is employed for supporting the meat to be cooked, a percolator for elevating the water, juice and cooking or seasoning material, and a sprinkler basin for distributing the elevated water, juice or material upon the piece of meat being cooked. Upon the basis of this combination, the invention includes certain novel features of construction, which will be presently described, and then specifically pointed out in the appended claims.

Referring to the drawing: Figure 1 is a perspective view of my utensil, Fig. 2 is a longitudinal sectional view, Fig. 3 is a cross sectional view, Fig. 4 is a plan of a portion of the perforated tray used in the utensil, and Fig. 5 is a perspective view of a percolator clasp.

To put my invention into practice, I construct the utensil of light and durable metal, the utensil consisting of a rectangular body 1 and a cover 2. The body 1 is provided with reinforced wire edges 3, while the cover 2 is provided with similar edges 4 having depending flanges 5ª adapted to fit in the upper edges of the body 1, and steady the cover upon the body of the utensil.

The body 1 of the utensil is provided with an inclined longitudinally corrugated platform 5, and at one end thereof with a transverse receptacle 6. Upon the platform 5 is supported a perforated tray 7 for holding the piece of meat to be cooked in the utensil.

The bottom 6' of the receptacle 6 is reinforced by a plate 8 having a tubular stem 9 extending through the said bottom 6' of the receptacle 6, and provided with a nut 10 to retain the plate 8 in engagement with the bottom of the receptacle.

Fitting over the stem 9 is a percolator, somewhat similar to percolators used in connection with coffee urns, and large coffee pots. The percolator comprises an exteriorly threaded shell 11 having a spider and central sleeve 12 for supporting the shell upon the stem 9. The shell 11 carries a hood 13, provided with a stand pipe 14 having its upper end bent at right angles to overhang the perforated tray 7.

Mounted upon the top of the shell 11 is an apertured disk 12' which acts as a deflector and a retarder. The disk 12' is to prevent any of the grease and water thrown up from the steam from hitting the hood 13. If the grease and water pass through the opening of the disk it will enter the pipe 14, consequently the disk will guide the grease and water into the pipe 14 or deflect the same downwardly again into the grease and water within the shell 11.

A resilient metallic clasp 15 is secured to the body 1 within the receptacle 6 to engage the stand pipe 14 and brace the same.

A perforated basin 16 is adjustably mounted upon the stand pipe 14, this basin being supported above the perforated tray 7 and beneath the discharge end 17 of the stand pipe 14. The weight of the perforated basin is adapted to maintain the same in a fixed position upon the stand pipe.

The cover 2 is provided with a suitable handle 18, and the ends of the body 1 are provided with handles 19. The handles 19 are preferably constructed of wire, and the ends of the wire are bent, as at 20, to engage the body 1 and prevent the handles 19 and the hands gripping said handles from contacting with the body 1. This type of handle is adapted to prevent the hands from being burned, while the utensil is being used and handled.

The juice or drippings from the piece of meat being cooked in the utensil passes through the perforated tray 7 onto the inclined platform 5, from where it flows into the receptacle 6. The utensil, whether located in an oven or upon a stove, collects sufficient heat to place the percolator in operation. The caloric pressure upon the fluid in the receptacle 6 forces the same upwardly in the shell 11, the stand pipe 14 discharging the same into the basin 16, from where it is equally distributed over the piece of meat lying upon the tray 7.

The operation of the percolator is further assisted by the tubular stem 9. As the plate 8 rests directly upon the bottom of an oven or upon a stove, the air in the bottom of the tubular stem will be subjected to a greater heat than the interior of the utensil.

I do not care to confine myself to the type of percolator used in connection with the utensil, or to its location. Such other structural changes as are permissible by the appended claims can be resorted to without departing from the scope of the invention.

Having now described my invention what I claim as new, is:—

1. A cooking utensil consisting of a body, a cover adapted to fit upon said body, an inclined corrugated platform arranged within said body, a receptacle at the lower end of said platform, a perforated tray supported by said platform, a percolator located in said receptacle and comprising a tubular stem, a shell fitting upon said stem, a hood fitting upon said shell, a stand pipe carried by said hood and having a discharge end above said tray, and a perforated basin adjustably supported by said stand pipe.

2. A cooking utensil comprising a body, an inclined corrugated platform arranged within said body, a receptacle arranged within the body at the lower end of said platform to receive the drippings therefrom, a perforated tray supported on said platform, a percolator mounted in said receptacle and embodying a tubular stem, a hood inclosing the upper portion of the stem, a stand pipe carried by said hood and having a laterally projected discharge end overhanging the perforated tray, and a perforated basin carried by said stand pipe and adjustable thereon.

In testimony whereof I affix my signature in the presence of two witnesses.

DAISY A. SCHAEFER.

Witnesses:
MAX H. SROLOVITZ,
A. J. TRIGG.